United States Patent
Qi et al.

(10) Patent No.: US 9,820,207 B2
(45) Date of Patent: Nov. 14, 2017

(54) CELL RESELECTION METHOD AND MOBILE TERMINAL

(71) Applicant: Huawei Device Co., Ltd., Shenzhen (CN)

(72) Inventors: Jianfeng Qi, Beijing (CN); Yajun Yu, Beijing (CN); Li Shen, Beijing (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 0 days.

(21) Appl. No.: 15/305,984

(22) PCT Filed: Apr. 22, 2015

(86) PCT No.: PCT/CN2015/077221
§ 371 (c)(1),
(2) Date: Oct. 21, 2016

(87) PCT Pub. No.: WO2015/161803
PCT Pub. Date: Oct. 29, 2015

(65) Prior Publication Data
US 2017/0048780 A1    Feb. 16, 2017

(30) Foreign Application Priority Data
Apr. 24, 2014 (CN) .......................... 2014 1 0169788

(51) Int. Cl.
*H04W 36/00* (2009.01)
*H04W 36/30* (2009.01)
(Continued)

(52) U.S. Cl.
CPC ....... *H04W 36/30* (2013.01); *H04W 36/0061* (2013.01); *H04W 48/08* (2013.01);
(Continued)

(58) Field of Classification Search
CPC . H04W 36/30; H04W 36/0061; H04W 48/08; H04W 48/16; H04W 48/20; Y02B 60/50
(Continued)

(56) References Cited

U.S. PATENT DOCUMENTS

2012/0231798 A1* 9/2012 Jian ....................... H04W 48/18
455/437
2013/0107737 A1 5/2013 Lee et al.
(Continued)

FOREIGN PATENT DOCUMENTS

CN    102223666 A    10/2011
CN    102457918 A    5/2012
(Continued)

*Primary Examiner* — Wayne Cai
(74) *Attorney, Agent, or Firm* — Leydig, Voit & Mayer, Ltd.

(57) ABSTRACT

Embodiments of the present invention provide a cell reselection method and a mobile terminal. The method includes: in a process of cell reselection, if learning through determining that a current serving cell is a high-quality cell, choosing to continue to camp on the serving cell, where the high-quality cell is a cell satisfying a determining rule for promoting a cell to a high-quality cell. According to the embodiments of the present invention, a cell satisfying a determining rule for promoting a cell to a high-quality cell is managed as a high-quality cell, and in a process of cell reselection, if a current serving cell is a high-quality cell occurs, a processing manner of continuing to camp on the current serving cell is selected, reducing frequent handovers between cells, improving service quality of a service, and reducing power consumption of a mobile terminal.

12 Claims, 4 Drawing Sheets

(51) Int. Cl.
    *H04W 48/08*     (2009.01)
    *H04W 48/16*     (2009.01)
    *H04W 48/20*     (2009.01)

(52) U.S. Cl.
    CPC ............ *H04W 48/16* (2013.01); *H04W 48/20* (2013.01); *Y02B 60/50* (2013.01)

(58) Field of Classification Search
    USPC ............ 455/436–442, 435.1–435.3; 370/331
    See application file for complete search history.

(56) References Cited

U.S. PATENT DOCUMENTS

| | | |
|---|---|---|
| 2014/0099956 A1 | 4/2014 | Wan et al. |
| 2014/0220975 A1* | 8/2014 | Makharia ............ H04W 76/048 455/436 |
| 2015/0237546 A1 | 8/2015 | Lin |
| 2015/0257056 A1* | 9/2015 | Yang ................ H04W 36/0083 455/437 |

FOREIGN PATENT DOCUMENTS

| | | |
|---|---|---|
| CN | 103298045 A | 9/2013 |
| CN | 103945478 A | 7/2014 |
| GB | 2489716 A | 10/2012 |

\* cited by examiner

CELL RESELECTION METHOD AND MOBILE TERMINAL

CROSS-REFERENCE TO RELATED APPLICATIONS

This application is a national stage of International Application No. PCT/CN2015/077221, filed on Apr. 22, 2015, which claims priority to Chinese Patent Application No. 201410169788.9, filed on Apr. 24, 2014. Both of the aforementioned applications are hereby incorporated by reference in their entireties.

TECHNICAL FIELD

Embodiments of the present invention relate to wireless communications technologies, and in particular, to a cell reselection method and a mobile terminal.

BACKGROUND

To enable a user to enjoy a relatively good service, it is required to ensure that a mobile terminal (User Equipment, UE for short) camps on a cell having relatively good quality. The 3rd Generation Partnership Project (3GPP) standard protocol specification is strictly followed in the prior art. When camping on a cell in a standard, the UE monitors a status of a neighboring cell in real time, and autonomously determines, according to a selection/reselection parameter in system information delivered by a network side, whether to perform cell selection/reselection and a handover between different systems. When the UE learns through measurement that signal quality of a serving cell that is currently camped on is not good, but signal quality of the neighboring cell is relatively good, the UE needs to hand over to the neighboring cell from the current serving cell according to the parameter, to ensure that the UE keeps camping on a cell having relatively good quality.

However, in the prior art, because the UE autonomously determines, according to the selection/reselection parameter in the system information delivered by the network side, whether to perform a cell handover, the following case may occur: The signal quality of the current serving cell is relatively good, but pilot pollution occurs, and according to the prior art, the UE may fall back from a Wide Band Code Division Multiple Access (WCDMA) cell (W for short) into a Global System for Mobile Communications (GSM) cell (G for short). Moreover, when being affected by a factor, the signal quality of the current serving cell is not good for only a short time, but a network parameter is not properly configured according to the prior art, the UE still hands over to the neighboring cell due to this short time of poor signal quality, and then hands over back after the signal quality of the previous serving cell recovers to a relatively good state, which causes a ping-pong effect between W and G and a ping-pong effect between Ws or Gs.

SUMMARY

For a disadvantage of frequent cell handovers in the prior art, embodiments of the present invention provide a cell reselection method and a mobile terminal.

A first aspect of the present invention provides a cell reselection method, including:

in a process of cell reselection, if learning through determining that a current serving cell is a high-quality cell, choosing to continue to camp on the serving cell, where the high-quality cell is a cell satisfying a determining rule for promoting a cell to a high-quality cell.

In the method provided in the first aspect, before the cell reselection is performed, the method further includes:

performing cell measurement on the serving cell to obtain measurement parameters; and if learning through determining according to the measurement parameters that the serving cell satisfies the determining rule, identifying the serving cell as a high-quality cell.

In the method provided in the first aspect, the measurement parameters include a camping time in which the serving cell has been camped on until the cell measurement is performed, and signal quality and signal strength of the serving cell when the cell measurement is performed, where correspondingly, the determining rule is:

according to the camping time, the signal quality and the signal strength, and respective corresponding weights, acquiring a reference value corresponding to the serving cell and determining whether the reference value reaches a predetermined value.

In the method provided in the first aspect, the determining rule is in a one-to-one correspondence with a cell standard, where a determining rule corresponding to a WCDMA cell is that a reference value $Q_{ex}$ reaches a predetermined value $Q_{max}$, where $$Q_{ex} = \text{Min}\left(\frac{t}{T_{std}} \times \partial_1, \partial_1\right) + \text{Min}\left(\frac{Q_{qualmax} - |Q_{qualmeas}|}{Q_{qualmax} - |Q_{qualstd}|} \times \partial_2, \partial_2\right) + \text{Min}\left(\left(\frac{Q_{rscpmax} - |Q_{rscpmeas}|}{Q_{rscpmax} - |Q_{rscpstd}|}\right) \times \partial_3, \partial_3\right),$$

where $\partial_1$, $\partial_2$, and $\partial_3$ are the weights respectively occupied by the camping time, the signal quality, and the signal strength, and satisfy $\partial_1 + \partial_2 + \partial_3 = 1$, $\partial_1 \geq 0$, $\partial_2 \geq 0$, and $\partial_3 \geq 0$; $T_{std}$ is a reference time length for promoting a cell to a high-quality cell, t is the camping time; $Q_{qualstd}$ is a reference value of a signal to noise ratio Ec/No, $Q_{qualmeas}$ is an actual measured value of the Ec/No; $Q_{rscpstd}$ is a reference value of received signal code power RSCP, and $Q_{rscpmeas}$ is an actual measured value of the RSCP; and $Q_{qual\ max}$ and $Q_{rscp\ max}$ are both preset maximum values, and $Q_{max} \leq 1$.

In addition, a determining rule corresponding to a GSM cell is that a reference value $Q_{ex}$ reaches a predetermined value $Q_{max}$, where $$Q_{ex} = \text{Min}\left(\frac{t}{T_{std}} \times \partial_4, \partial_4\right) + \text{Min}\left(\frac{Q_{rxlevmax} - |Q_{rxlevmeas}|}{Q_{rxlevmax} - |Q_{rxlevstd}|} \times \partial_5, \partial_5\right) + \text{Min}\left(\left(\frac{SNR_{max} - |SNR_{meas}|}{SNR_{max} - |SNR_{std}|}\right) \times \partial_6, \partial_6\right),$$

where $\partial_4$, $\partial_5$, and $\partial_6$ are the weights respectively occupied by the camping time, the signal strength, and a signal to noise ratio, and satisfy $\partial_4 + \partial_5 + \partial_6 = 1$, $\partial_4 \geq 0$, $\partial_5 \geq 0$ and $\partial_6 \geq 0$; $T_{std}$ is a reference time length for promoting a cell to a high-quality cell, t is the camping time; $Q_{rxlevstd}$ is a reference value of received signal strength indicator RSSI, $Q_{rxlevmeas}$ is an actual measured value of the RSSI; $SNR_{std}$ is a reference value of the signal to noise ratio, and $SNR_{meas}$ is an actual measured value of the signal to noise ratio; and $Q_{rxlev\ max}$ and $SNR_{max}$ are both preset maximum values, and $Q_{max} \leq 1$.

The method provided in the first aspect further includes:

in the process of the cell reselection, if learning through determining that the current serving cell is not a high-quality cell, continuing to determine whether a neighboring cell is a high-quality cell, if the neighboring cell is a high-quality cell, determining whether the neighboring cell used as a high-quality cell satisfies a camping condition, and if the neighboring cell satisfies a camping condition, handing over to the neighboring cell used as a high-quality cell, where if the neighboring cell is a WCDMA cell, a corresponding camping condition includes:

$Q_{qualmeas} > Q_{qual\ min}$ && $Q_{rscpmeas} > Q_{rscp\ min}$ && last $t_{min}$ seconds, where $Q_{qualmeas}$ is an actual measured value of a signal to noise ratio Ec/No corresponding to the neighboring cell, $Q_{rscpmeas}$ is an actual measured value of received signal code power RSCP corresponding to the neighboring cell, $Q_{qual\ min}$ and $Q_{rscp\ min}$ are both minimum preset access values for being a high-quality cell, and $t_{min}$ represents minimum duration in which $Q_{qualmeas} > Q_{qual\ min}$ and $Q_{rscpmeas} > Q_{rscp\ min}$ are both satisfied.

If the neighboring cell is a GSM cell, a corresponding camping condition includes:

$Q_{rxlevmeas} > Q_{rxlev\ min}$ && lasts $t_{min}$ seconds, where $Q_{rxlevmeas}$ is an actual measured value of received signal strength indicator RSSI corresponding to the neighboring cell, $Q_{rxlev\ min}$ is a preset minimum access value for being a high-quality cell, and $t_{min}$ represents minimum duration in which $Q_{rxlevmeas} > Q_{rxlev\ min}$ is satisfied.

In the method provided in the first aspect, the identifying a target cell as a high-quality cell includes:

dividing a database into multiple partitions according to cell standards, and storing a cell identity of the target cell in a partition of a corresponding standard.

A second aspect of the present invention provides a mobile terminal, including:

a determining module, configured to: in a process of cell reselection, determine whether a current serving cell is a high-quality cell; and a processing module, configured to: if it is learned through determining that the current serving cell is a high-quality cell, choose to continue to camp on the serving cell, where the high-quality cell is a cell satisfying a determining rule for promoting a cell to a high-quality cell.

The mobile terminal provided in the second aspect further includes:

a measuring module, configured to perform cell measurement on the serving cell to obtain measurement parameters; and an identifying module, configured to: if it is learned through determining according to the measurement parameters that the serving cell satisfies the determining rule, identify the serving cell as a high-quality cell.

In the mobile terminal provided in the second aspect, the measurement parameters include a camping time in which the serving cell has been camped on until the cell measurement is performed, and signal quality and signal strength of the serving cell when the cell measurement is performed, where correspondingly, the determining rule is:

according to the camping time, the signal quality and the signal strength, and respective corresponding weights, acquiring a reference value corresponding to the serving cell and determining whether the reference value reaches a predetermined value.

In the mobile terminal provided in the second aspect, the determining rule is the same as the forgoing determining rule.

In the mobile terminal provided in the second aspect, the processing module is further configured to:

in the process of the cell reselection, if it is learned through determining that the current serving cell is not a high-quality cell, continue to determine whether a neighboring cell is a high-quality cell, if the neighboring cell is a high-quality cell, determine whether the neighboring cell used as a high-quality cell satisfies a camping condition, and if the neighboring cell satisfies a camping condition, hand over to the neighboring cell used as a high-quality cell, where if the neighboring cell is a WCDMA cell, a corresponding camping condition includes:

$Q_{qualmeas} > Q_{qual\ min}$ && $Q_{rscpmeas} > Q_{rscp\ min}$ && last $t_{min}$ seconds, where $Q_{qualmeas}$ is an actual measured value of a signal to noise ratio Ec/No corresponding to the neighboring cell, $Q_{rscpmeas}$ is an actual measured value of received signal code power RSCP corresponding to the neighboring cell, $Q_{qual\ min}$ and $Q_{rscp\ min}$ are both minimum preset access values for being a high-quality cell, and $t_{min}$ represents minimum duration in which $Q_{qualmeas} > Q_{qual\ min}$ and $Q_{rscpmeas} > Q_{rscp\ min}$ are both satisfied.

If the neighboring cell is a GSM cell, a corresponding camping condition includes:

$Q_{rxlevmeas} > Q_{rxlev\ min}$ && lasts $t_{min}$ seconds, where $Q_{rxlevmeas}$ is an actual measured value of received signal strength indicator RSSI corresponding to the neighboring cell, $Q_{rxlev\ min}$ is a preset minimum access value for being a high-quality cell, and $t_{min}$ represents minimum duration in which $Q_{rxlevmeas} > Q_{rxlev\ min}$ is satisfied.

The mobile terminal provided in the second aspect further includes:

a database, where the database is divided into multiple partitions according to cell standards, and is configured to store an identity of a cell used as a high-quality cell.

According to the cell reselection method and the mobile terminal provided in the embodiments of the present invention, a cell satisfying a determining rule for promoting a cell to a high-quality cell is managed as a high-quality cell, and in a process of cell reselection, if a current serving cell is a high-quality cell occurs, a processing manner of continuing to camp on the current serving cell is selected, reducing frequent handovers between cells, improving service quality of a service, and reducing power consumption of a mobile terminal.

DESCRIPTION OF EMBODIMENTS

When there are multiple cells differing little in strength in an area in which UE camps, the UE may be caused to perform frequent handovers between cells. On one hand, the frequent handovers increase power consumption of the UE and reduce service life of a battery. On the other hand, the frequent handovers also cause loss of some paging to the UE and affect user experience to some extent. It is considered that most users generally stay in several fixed places; when a user stays in a place, to enable a mobile terminal of the user to preferentially camp on a cell having a relatively good signal and not to perform an unnecessary handover if signal quality differs little, embodiments of the present invention provide a solution, that is, to measure a cell that is camped on, and determine whether the cell satisfies a condition of a high-quality cell, and if yes, identify the cell as a high-quality cell. After the mobile terminal camps on a high-quality cell, when according to a selection/reselection parameter delivered by a network side, cell reselection needs to be triggered, the mobile terminal can choose to continue to camp on this high-quality cell, rather than perform a cell handover, thereby avoiding frequent cell handovers.

Figure 1:
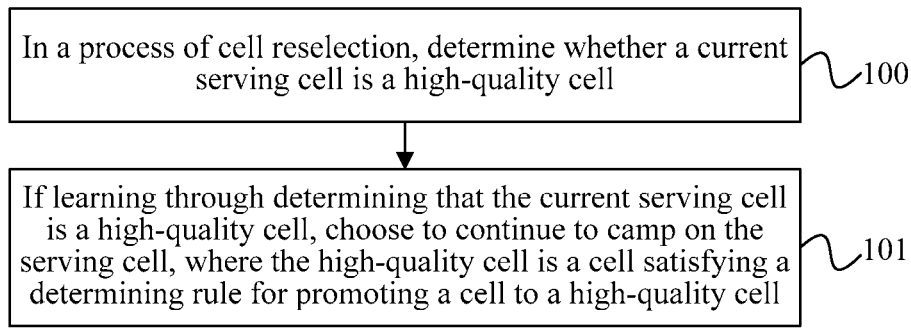
FIG. 1 is a flowchart of an embodiment of a cell reselection method according to the present invention.

FIG. 1 is a flowchart of an embodiment of a cell reselection method according to the present invention. As shown in FIG. 1, the method includes:

Step 100: In a process of cell reselection, determine whether a current serving cell is a high-quality cell.

Step 101: If learning through determining that the current serving cell is a high-quality cell, choose to continue to camp on the serving cell, where the high-quality cell is a cell satisfying a determining rule for promoting a cell to a high-quality cell.

Specifically, when according to a selection/reselection parameter delivered by a network side, a mobile terminal needs to trigger cell reselection, the mobile terminal may first determine, according to a locally stored high-quality cell list, whether a current serving cell is a high-quality cell. The high-quality cell list includes description information of all cells that are identified as high-quality cells, for example, cell identities. Certainly, this embodiment of the present invention is not limited to the high-quality cell list, and another storage manner may be used. The high-quality cell may be specifically a cell satisfying a determining rule for promoting a cell to a high-quality cell. When it is learned that a cell satisfies the determining rule for promoting a cell to a high-quality cell, the cell may be identified as a high-quality cell. The mobile terminal learns through determining according to the high-quality cell list that the current serving cell is a high-quality cell, and chooses to continue to camp on this high-quality cell, rather than perform a cell handover, thereby avoiding frequent cell handovers.

Figure 2:
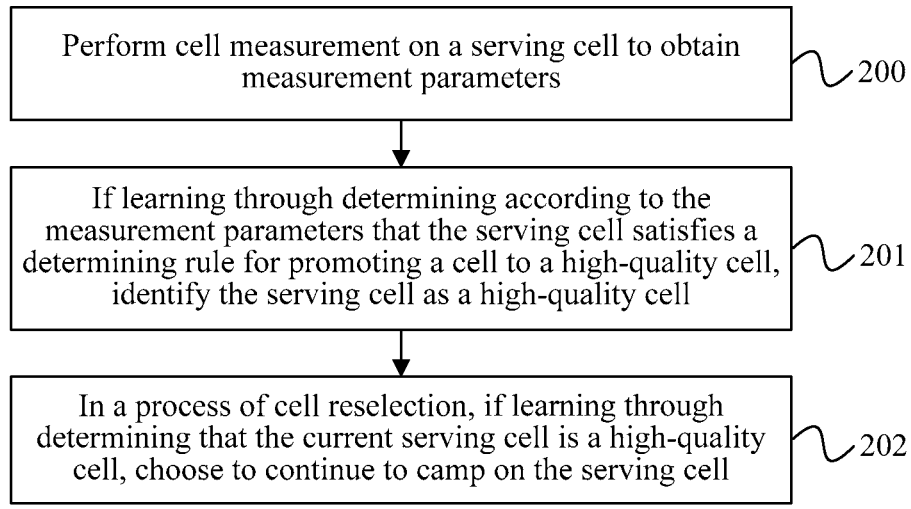
FIG. 2 is a flowchart of another embodiment of a cell reselection method according to the present invention.

FIG. 2 is a flowchart of another embodiment of a cell reselection method according to the present invention. As shown in FIG. 2, the method includes:

Step 200: Perform cell measurement on a serving cell to obtain measurement parameters.

A mobile terminal performs cell measurement to obtain measurement parameters, where the cell measurement may be executed according to a processing process in the prior art, which is not described herein.

Step 201: If learning through determining according to the measurement parameters that the serving cell satisfies a determining rule for promoting a cell to a high-quality cell, identify the serving cell as a high-quality cell.

After obtaining measurement parameters of a target cell, for example, the current serving cell, the mobile terminal determines, according to a preset determining rule, whether the serving cell can be promoted to a high-quality cell, and if learning through determining that the serving cell satisfies the determining rule for promoting a cell to a high-quality cell, identifies the serving cell as a high-quality cell. In this embodiment of the present invention, it is only required to identify whether one cell is a high-quality cell, and multiple different manners may be used to perform identification, which are not limited herein.

In this method embodiment, the measurement parameters include a camping time in which the serving cell has been camped on until the cell measurement is performed, and signal quality and signal strength of the serving cell when the cell measurement is performed, where correspondingly, the determining rule is: according to the camping time, the signal quality and the signal strength, and respective corresponding weights, acquiring a reference value corresponding to the serving cell and determining whether the reference value reaches a predetermined value.

Step 202: In a process of cell reselection, if learning through determining that the current serving cell is a high-quality cell, choose to continue to camp on the serving cell.

The mobile terminal performs the cell measurement on a cell to which several frequently visited places belong, and determines whether the cell is a high-quality cell, and then may classify a cell having relatively good signal quality into a range of a high-quality cell. When getting second time within the range covered by the cell, the mobile terminal may preferentially choose to camp on this high-quality cell by using a rule. In addition, in this embodiment of the present invention, in a process of triggering cell reselection according to a network parameter delivered by the network side, in a case in which, for example, measurement parameters of a neighboring cell are better than the measurement parameters of the current serving cell but the measurement parameters of the neighboring cell and the measurement parameters of the current serving cell differ little, the mobile terminal may not hand over to the neighboring cell according to a processing manner in the prior art, but first check whether the current serving cell is a high-quality cell, and if yes, do not hand over to the neighboring cell, and choose to continue to camp on the current serving cell, avoiding frequent handovers between cells.

According to the cell reselection method provided in this embodiment of the present invention, it is determined, according to related measurement parameters of a cell that is camped on, whether the cell satisfies a determining rule for promoting a cell to a high-quality cell, and if yes, the cell is managed as a high-quality cell, and in a process of cell reselection, if a current serving cell is a high-quality cell occurs, a processing manner of continuing to camp on the current serving cell is selected, reducing frequent handovers between cells, improving service quality of a service, and reducing power consumption of a mobile terminal.

Figure 3:
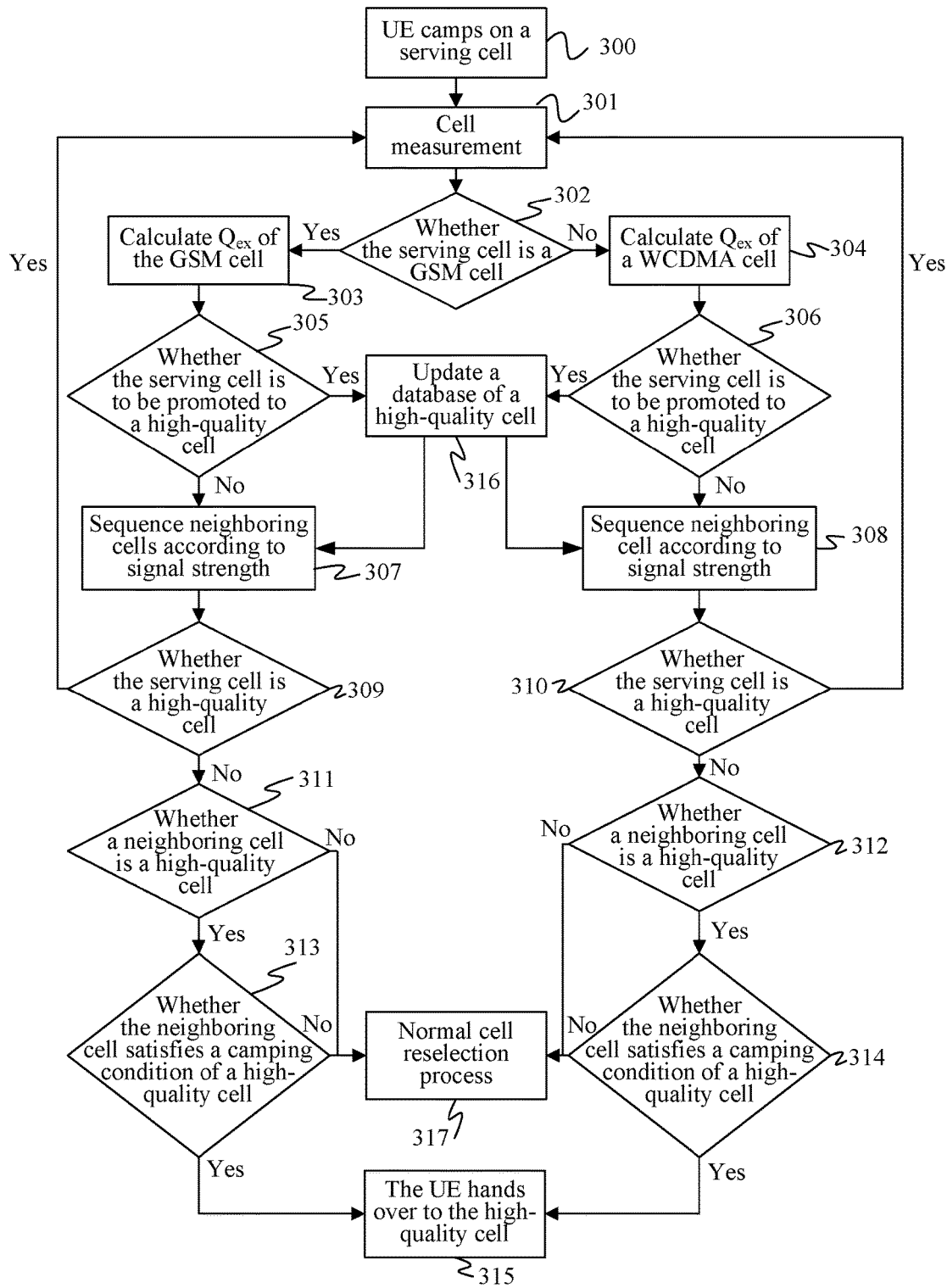
FIG. 3 is a flowchart of still another embodiment of a cell reselection method according to the present invention.

FIG. 3 is a flowchart of still another embodiment of a cell reselection method according to the present invention. That a cell includes a GSM cell and a WCDMA cell is used as an example in this embodiment. As shown in FIG. 3, the method includes:

Step 300: UE camps on a current serving cell.

Step 301: The UE executes cell measurement.

In this embodiment of the present invention, UE may perform cell measurement on both a current serving cell and a neighboring cell, to obtain respective measurement parameters of the serving cell and the neighboring cell, where the measurement parameters include a camping time in which the serving cell has been camped on until the cell measurement is performed, and signal quality and signal strength of the serving cell when the cell measurement is performed.

Step 302: Determine whether the current serving cell is a GSM cell. If yes, step 303 is performed; or if not, step 304 is performed.

Step 303: Calculate a reference value ex of the serving cell. $Q_{ex}$ of a GSM cell is calculated herein.

Step 305: Determine whether the serving cell can be promoted to a high-quality cell. If yes, an operation of updating a database of a high-quality cell in step 316 is executed, and then step 307 is performed; or if not, step 307 is directly performed.

In this embodiment of the present invention, a determining rule that is used to determine whether a cell can be promoted to a high-quality cell is in one-to-one correspondence with a cell standard, that is, determining rules corresponding to cells in different standards may be different from each other, and a determining rule corresponding to a GSM cell is that when the reference value $Q_{ex}$ reaches a predetermined value max, the cell is promoted to a high-quality cell:

$$Q_{ex} = \text{Min}\left(\frac{t}{T_{std}} \times \partial_4, \partial_4\right) + \text{Min}\left(\frac{Q_{rxlevmax} - |Q_{rxlevmeas}|}{Q_{rxlevmax} - |Q_{rxlevstd}|} \times \partial_5, \partial_5\right) + \text{Min}\left(\left(\frac{SNR_{max} - |SNR_{meas}|}{SNR_{max} - |SNR_{std}|}\right) \times \partial_6, \partial_6\right),$$

where $\partial_4$, $\partial_5$, and $\partial_6$ are weights respectively occupied by the camping time, the signal strength, and a signal to noise ratio, and satisfy $\partial_4+\partial_5+\partial_6=1$, $\partial_4 \geq 0$, $\partial_5 \geq 0$, and $\partial_6 \geq 0$. $T_{std}$ is a reference time length for promoting a cell to a high-quality cell, t is a length of time in which the current cell is camped on, larger t indicates a longer time in which the current cell is camped on, and a larger weight occupied by $\partial_4$ indicates a larger weight for promoting a cell to a high-quality cell, where a maximum value is $\partial_4$.

$Q_{rxlevstd}$ is a reference value of received signal strength indicator RSSI in the GSM, $Q_{rxlevmeas}$ is an actual measured value of the RSSI obtained by a mobile phone by means of radio frequency measurement, and larger $Q_{rxlevmeas}$ of the current cell indicates a larger weight occupied by $\partial_5$ and a larger weight for promoting a cell to a high-quality cell, where a maximum value is $\partial_5$. The RSSI may refer to all powers received at a carrier frequency by the mobile phone, and includes a useful signal (which certainly includes a pilot signal), interference from another user in this cell, interference from a neighboring cell, background noise, interference outside a system, and the like.

$SNR_{std}$ is a reference value of the signal to noise ratio in the GSM cell, $SNR_{meas}$ is an actual measured value of the signal to noise ratio of the current cell, and larger $SNR_{meas}$ of the current cell that is camped on indicates a larger weight occupied by $\partial_6$ and a larger weight for promoting a cell to a high-quality cell, where a maximum value is $\partial_6$.

$Q_{rxlev\ max}$ and $SNR_{max}$ are both preset maximum values, and $Q_{max} \leq 1$.

Step 307: Sequence neighboring cells according to signal strength.

The neighboring cells are neighboring cells corresponding to the current serving cell, and the neighboring cells are sequenced in this step to prepare for a subsequent normal cell reselection process.

Step 309: Determine whether the current serving cell is a high-quality cell. If yes, step 301 is performed, to choose to continue to camp on the current serving cell and perform the cell measurement; or if not, step 311 is performed.

If triggering a cell reselection process according to a network parameter sent by a network side, the UE in this embodiment of the present invention first needs to determine whether the current serving cell is a high-quality cell, and performs different operations according to different determining results.

Step 311: Determine whether a neighboring cell is a high-quality cell. If yes, step 313 is performed; or if not, step 317 is performed.

If the current serving cell is not a high-quality cell, the UE continues to determine, according to the database of the high-quality cell, whether a neighboring cell is a high-quality cell, which may be performed according to a sequence in step 307, for example, it is preferentially determined whether a neighboring cell sequenced in the front is a high-quality cell.

Step 313: Determine whether the neighboring cell satisfies a camping condition of a high-quality cell. If yes, step 315 is performed; or if not, step 317 is performed.

The selected neighboring cell may be a GSM cell, or may be a WCDMA cell, and camping conditions corresponding to cells in different standards may also be different.

Step 315: The UE hands over to the high-quality cell, and the process ends.

Step 317: Execute a normal cell reselection process, and the process ends.

The method further includes:

Step 304: Calculate $Q_{ex}$ of the serving cell. $Q_{ex}$ of a WCDMA cell is calculated herein.

Step 306: Determine whether the serving cell can be promoted to a high-quality cell. If yes, an operation of updating a database of a high-quality cell in step 316 is executed, and then step 308 is performed; or if not, step 308 is directly performed.

In this embodiment of the present invention, a determining rule corresponding to a WCDMA cell is that when the reference value $Q_{ex}$ reaches a predetermined value $Q_{max}$, the cell is promoted to a high-quality cell:

$$Q_{ex} = \text{Min}\left(\frac{t}{T_{std}} \times \partial_1, \partial_1\right) + \text{Min}\left(\frac{Q_{qualmax} - |Q_{qualmeas}|}{Q_{qualmax} - |Q_{qualstd}|} \times \partial_2, \partial_2\right) + \text{Min}\left(\left(\frac{Q_{rscpmax} - |Q_{rscpmeas}|}{Q_{rscpmax} - |Q_{rscpstd}|}\right) \times \partial_3, \partial_3\right),$$

where $\partial_1$, $\partial_2$, and $\partial_3$ are the weights respectively occupied by the camping time, the signal quality, and the signal strength, and satisfy $\partial_1+\partial_2+\partial_3=1$, $\partial_1 \geq 0$, $\partial_2 \geq 0$, and $\partial_3 \geq 0$. $T_{std}$ is a reference time length for promoting a cell to a high-quality cell, t is a length of time in which the current cell is camped on, larger t indicates a longer time in which the current cell is camped on, and a larger weight occupied by $\partial_1$ indicates a larger weight for promoting a cell to a high-quality cell, where a maximum value is $\partial_1$.

$Q_{qualstd}$ is a reference value of the signal quality, for example, a signal to noise ratio Ec/No, in the WCDMA, $Q_{qualmeas}$ is an actual measured value of the Ec/No obtained by a mobile phone by means of radio frequency measurement, and larger $Q_{qualmeas}$ of the current cell that is camped on indicates a larger weight occupied by $\partial_2$, and a larger weight for promoting a cell to a high-quality cell, where a maximum value is $\partial_2$. Ec/No may refer to a ratio of energy of each chip on each code channel to a band-limited white noise spectral density after spread spectrum of a transmit end, that is, a ratio of energy of chip to interference plus noise; and a smaller value indicates poorer signal quality.

$Q_{rscpstd}$ is a reference value of received signal code power RSCP in the WCDMA, $Q_{rscpmeas}$ is an actual measured value of the RSCP obtained by a mobile phone by means of radio frequency measurement, and larger $Q_{rscpmeas}$ of the current cell that is camped on indicates a larger weight occupied by $\partial_3$, and a larger weight for promoting a cell to a high-quality cell, where a maximum value is $\partial_3$. The RSCP (Receive Signal Channel Power) generally refers to a pilot channel strength, which can be understood as signal strength of a pilot channel received by the mobile phone in this embodiment of the present invention.

$Q_{qual\ max}$ and $Q_{rscp\ max}$ are both preset maximum values, and $Q_{max} \leq 1$.

Step 308: Sequence neighboring cells according to signal strength.

This step is the same as step 307, which is not described herein again.

Step 310: Determine whether the current serving cell is a high-quality cell. If yes, step 301 is performed, to choose to continue to camp on the current serving cell and perform the cell measurement; or if not, step 312 is performed.

If triggering a cell reselection process according to a network parameter sent by a network side, the UE in this embodiment of the present invention first needs to determine whether the current serving cell is a high-quality cell, and performs different operations according to different determining results.

Step 312: Determine whether the neighboring cell is a high-quality cell. If yes, step 314 is performed; or if not, step 317 is performed.

If the current serving cell is not a high-quality cell, the UE continues to determine, according to the database of the high-quality cell, whether a neighboring cell is a high-quality cell, which may be performed according to a sequence in step 308, for example, it is preferentially determined whether a neighboring cell sequenced in the front is a high-quality cell.

Step 314: Determine whether the neighboring cell satisfies a camping condition of a high-quality cell. If yes, step 315 is performed; or if not, step 317 is performed.

In the foregoing method embodiment, determining rules that correspond to cells in different standards and that are used to determine whether to promote a cell to a high-quality cell are different, and certainly may be the same, for example, only the camping time is considered.

In addition, the determining rule provided in this embodiment of the present invention includes the parameters, such as the camping time, the signal strength, and the signal quality/signal to noise ratio, and certainly may also include, according to an actual requirement, another parameter that is not mentioned in this embodiment and that is used to determine, or may select one or a combination of the parameters to determine. The determining rule is not specifically limited in the present invention.

For measured values of the parameters involved in the embodiments of the present invention, refer to experience that is obtained from statistics collection results in a period of time.

In the step, involved in the forgoing method embodiment, of determining whether the neighboring cell satisfies a camping condition of a high-quality cell, the camping condition may be in one-to-one correspondence with a cell standard, or a same camping condition may be used, which is not limited. A detailed description is provided below based on that a GSM cell and a WCDMA cell correspond to different camping conditions.

In the foregoing method embodiment, in the process of the cell reselection, if it is learned through determining that the current serving cell is not a high-quality cell, the UE continues to determine whether a neighboring cell is a high-quality cell, if the neighboring cell is a high-quality cell, the UE determines whether the neighboring cell used as a high-quality cell satisfies a camping condition, and if the neighboring cell satisfies a camping condition, the UE hands over to the neighboring cell used as a high-quality cell.

If the neighboring cell is a WCDMA cell, a corresponding camping condition includes:

$Q_{qualmeas} > Q_{qual\ min}$ && $Q_{rscpmeas} > Q_{rscp\ min}$ && last $t_{min}$ seconds, where $Q_{qualmeas}$ is an actual measured value of a signal to noise ratio Ec/No corresponding to the neighboring cell, $Q_{rscpmeas}$ is an actual measured value of received signal code power RSCP corresponding to the neighboring cell, $Q_{qual\ min}$ and $Q_{rscp\ min}$ are both minimum preset access values for being a high-quality cell, and $t_{min}$ represents minimum duration in which $Q_{qualmeas} > Q_{qual\ min}$ and $Q_{rscpmeas} > Q_{rscp\ min}$ are both satisfied.

If the neighboring cell is a GSM cell, a corresponding camping condition includes:

$Q_{rxlevmeas} > Q_{rxlev\ min}$ && lasts $t_{min}$ seconds, where $Q_{rxlevmeas}$ is an actual measured value of received signal strength indicator RSSI corresponding to the neighboring cell, $Q_{rxlev\ min}$ is a preset minimum access value for being a high-quality cell, and $t_{min}$ represents minimum duration in which $Q_{rxlevmeas} > Q_{rxlev\ min}$ is satisfied.

Figure 4:
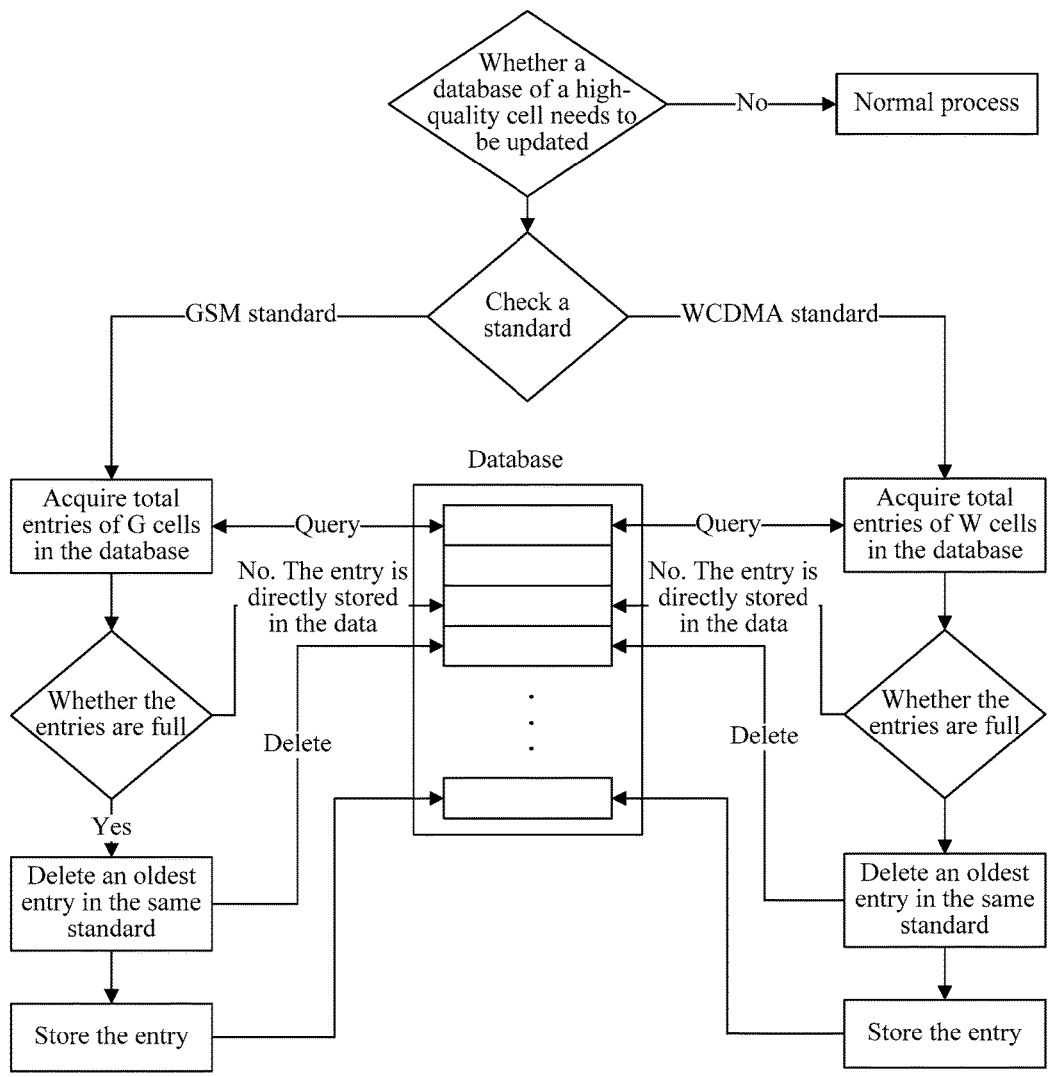
FIG. 4 is a schematic diagram of update of a database of a high-quality cell according to the present invention.

In the foregoing method embodiment, the operation of updating the database of the high-quality cell executed in step 316 may be specifically executed with reference to a process shown in the FIG. 4. In this embodiment of the present invention, the database may be divided into multiple partitions according to cell standards, and an identity of a cell used as a high-quality cell is stored in a partition of a corresponding standard. Each standard can store M cells at most. A cell attribute includes information, such as a standard (RAT), a absolute radio frequency channel number, a primary scrambling code, a PLMN, a CellID, and Lac, as shown in the following table:

| Serial | RAT | ARFCN | PSC | Cellid | Lac | PLMN | ... |
|---|---|---|---|---|---|---|---|
| 1 | GSM | 34 | / | ... | ... | ... | ... |
| 2 | GSM | 40 | / | ... | ... | ... | ... |
| ... | ... | ... | / | ... | ... | ... | ... |
| M | GSM | 45 | / | ... | ... | ... | ... |
| M + 1 | WCDMA | 10713 | 200 | ... | ... | ... | ... |
| ... | ... | ... | ... | ... | ... | ... | ... |
| 2M | WCDMA | ... | ... | ... | ... | ... | ... |

When the UE is powered on, the UE reads cell information from the database for use during selection of a high-quality cell.

High-quality cells are stored in a first-in-first-out queue mode. When a normal cell becomes a high-quality cell, and needs to be stored in the database, if the database is not full, the cell is directly stored. Otherwise, an "oldest" cell in a same standard and put into the table at the earliest needs to be released, and then the cell is stored.

In the foregoing method embodiment shown in FIG. 3, it can be understood that, step 302, step 303 and step 305 (step 304 and step 306 are similar thereto), and step 316 that are shown in the figure and that are after step 301 of cell measurement may be executed only once after the current serving cell is camped on for the first time, and in a subsequent process, the process of determining whether the current serving cell can be promoted to a high-quality cell may be not executed every time, but it is directly determined according to the database whether the current serving cell is a high-quality cell, which can reduce power consumption of the mobile terminal. Certainly, the process of determining whether the current serving cell can be promoted to a high-quality cell may also be executed every time. This embodiment of the present invention sets no limitation thereto.

It can be known from above that, if a current serving cell and a neighboring cell differ little in signal quality, cell selection based on a memory function can enable UE to camp for a relatively long time on a high-quality cell that is often camped on, which reduces frequent handovers between cells, and achieves effects of terminal power consumption reduction, high signal quality and a high call completion ratio, and good user experience.

Figure 5:
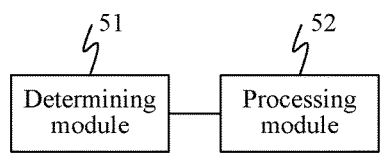
FIG. 5 is a schematic composition diagram of an embodiment of a mobile terminal according to the present invention.

FIG. 5 is a schematic composition diagram of an embodiment of a mobile terminal according to the present invention. As shown in FIG. 5, the mobile terminal may include a determining module 51 and a processing module 52, where the determining module 51 is configured to: in a process of cell reselection, determine whether a current serving cell is a high-quality cell; and the processing module 52 is configured to: if it is learned through determining that the current serving cell is a high-quality cell, choose to continue to camp on the serving cell, where the high-quality cell is a cell satisfying a determining rule for promoting a cell to a high-quality cell.

Specifically, when according to a selection/reselection parameter delivered by a network side, a mobile terminal needs to trigger cell reselection, first the determining module 51 may determine, according to a locally stored high-quality cell list, whether a current serving cell is a high-quality cell. The high-quality cell list includes description information of all cells that are identified as high-quality cells, for example, cell identities. Certainly, this embodiment of the present invention is not limited to the high-quality cell list, and another storage manner may be used. The high-quality cell may be specifically a cell satisfying a determining rule for promoting a cell to a high-quality cell. When it is learned that a cell satisfies the determining rule for promoting a cell to a high-quality cell, the cell may be identified as a high-quality cell. The determining module 51 learns through determining according to the high-quality cell list that the current serving cell is a high-quality cell, and the processing module 52 chooses to continue to camp on the high-quality cell, rather than performs a cell handover, thereby avoiding frequent cell handovers.

In the foregoing apparatus embodiment, the mobile terminal may further include a measuring module and an identifying module, where the measuring module is configured to perform cell measurement on the serving cell to obtain measurement parameters; and the identifying module is configure to: if it is learned through determining according to the measurement parameters that the serving cell satisfies the determining rule, identify the serving cell as a high-quality cell.

Specifically, the measurement parameters include a camping time in which the serving cell has been camped on until the cell measurement is performed, and signal quality and signal strength of the serving cell when the cell measurement is performed, where correspondingly, the determining rule is: according to the camping time, the signal quality and the signal strength, and respective corresponding weights, acquiring a reference value corresponding to the serving cell and determining whether the reference value reaches a predetermined value.

In the foregoing apparatus embodiment, the determining rule is in one-to-one correspondence with a cell standard, where a determining rule corresponding to a WCDMA cell is that a reference value $Q_{ex}$ reaches a predetermined value $Q_{max}$, where $$Q_{ex} = \text{Min}\left(\frac{t}{T_{std}} \times \partial_1, \partial_1\right) + \text{Min}\left(\frac{Q_{qualmax} - |Q_{qualmeas}|}{Q_{qualmax} - |Q_{qualstd}|} \times \partial_2, \partial_2\right) + \text{Min}\left(\left(\frac{Q_{rscpmax} - |Q_{rscpmeas}|}{Q_{rscpmax} - |Q_{rscpstd}|}\right) \times \partial_3, \partial_3\right),$$

where $\partial_1$, $\partial_2$, and $\partial_3$ are the weights respectively occupied by the camping time, the signal quality, and the signal strength, and satisfy $\partial_1 + \partial_2 + \partial_3 = 1$, $\partial_1 \geq 0$, $\partial_2 \geq 0$, and $\partial_3 \geq 0$; $T_{std}$ is a reference time length for promoting a cell to a high-quality cell, t is the camping time; $Q_{qualstd}$ is a reference value of a signal to noise ratio Ec/No, $Q_{qualmeas}$ is an actual measured value of the Ec/No; $Q_{rscpstd}$ is a reference value of received signal code power RSCP, and $Q_{rscpmeas}$ is an actual measured value of the RSCP; and $Q_{qual\ max}$ and $Q_{rscp\ max}$ are both preset maximum values, and $Q_{max} \leq 1$.

A determining rule corresponding to a GSM cell is that a reference value $Q_{ex}$ reaches a predetermined value $Q_{max}$, where $$Q_{ex} = \text{Min}\left(\frac{t}{T_{std}} \times \partial_4, \partial_4\right) + \text{Min}\left(\frac{Q_{rxlevmax} - |Q_{rxlevmeas}|}{Q_{rxlevmax} - |Q_{rxlevstd}|} \times \partial_5, \partial_5\right) + \text{Min}\left(\left(\frac{SNR_{max} - |SNR_{meas}|}{SNR_{max} - |SNR_{std}|}\right) \times \partial_6, \partial_6\right),$$

where $\partial_4$, $\partial_5$, and $\partial_6$ are the weights respectively occupied by the camping time, the signal strength, and a signal to noise ratio, and satisfy $\partial_4 + \partial_5 + \partial_6 = 1$, $\partial_4 \geq 0$, $\partial_5 \geq 0$, and $\partial_6 \geq 0$; $T_{std}$ is a reference time length for promoting a cell to a high-quality cell, t is the camping time; $Q_{rxlevstd}$ is a reference value of received signal strength indicator RSSI, $Q_{rxlevmeas}$ is an actual measured value of the RSSI; $SNR_{std}$ is a reference value of the signal to noise ratio, and $SNR_{meas}$ is an actual measured value of the signal to noise ratio; and $Q_{rxlev\ max}$ and $SNR_{max}$ are both preset maximum values, and $Q_{max} \leq 1$.

Specifically, the processing module 52 is further configured to: in the process of the cell reselection, if it is learned through determining that the current serving cell is not a high-quality cell, continue to determine whether a neighboring cell is a high-quality cell, if the neighboring cell is a high-quality cell, determine whether the neighboring cell used as a high-quality cell satisfies a camping condition, and if the neighboring cell satisfies a camping condition, hand over to the neighboring cell used as a high-quality cell, where if the neighboring cell is a WCDMA cell, a corresponding camping condition includes:

$Q_{qualmeas} > Q_{qual\ min}$ && $Q_{rscpmeas} > Q_{rscp\ min}$ && last $t_{min}$ seconds, where $Q_{qualmeas}$ is an actual measured value of a signal to noise ratio Ec/No corresponding to the neighboring cell, $Q_{rscpmeas}$ is an actual measured value of received signal code power RSCP corresponding to the neighboring cell, $Q_{qual\ min}$ and $Q_{rscp\ min}$ are both minimum preset access values for being a high-quality cell, and $t_{min}$ represents minimum duration in which $Q_{qualmeas} > Q_{qual\ min}$ and $Q_{rscpmeas} > Q_{rscp\ min}$ are both satisfied.

If the neighboring cell is a GSM cell, a corresponding camping condition includes:

$Q_{rxlevmeas} > Q_{rxlev\ min}$ && lasts $t_{min}$ seconds, where
$Q_{rxlevmeas}$ is an actual measured value of received signal strength indicator RSSI corresponding to the neighboring cell, $Q_{rxlev\ min}$ is a preset minimum access value for being a high-quality cell, and $t_{min}$ represents minimum duration in which $Q_{rxlevmeas} > Q_{rxlev\ min}$ is satisfied.

Further, the mobile terminal may further include a database, where the database is divided into multiple partitions according to cell standards, and is configured to store an identity of a cell used as a high-quality cell.

The mobile terminal provided in this embodiment of the present invention is specifically configured to execute processing processes provided in the foregoing method embodiments, which are not described herein again.

According to the mobile terminal provided in this embodiment of the present invention, it is determined, according to related measurement parameters of a cell that is camped on, whether the cell satisfies a determining rule for promoting a cell to a high-quality cell, and if yes, the cell is managed as a high-quality cell, and in a process of cell reselection, if a current serving cell is a high-quality cell occurs, a processing manner of continuing to camp on the current serving cell is selected, reducing frequent handovers between cells, improving service quality of a service, and reducing power consumption of the mobile terminal.

Figure 6:
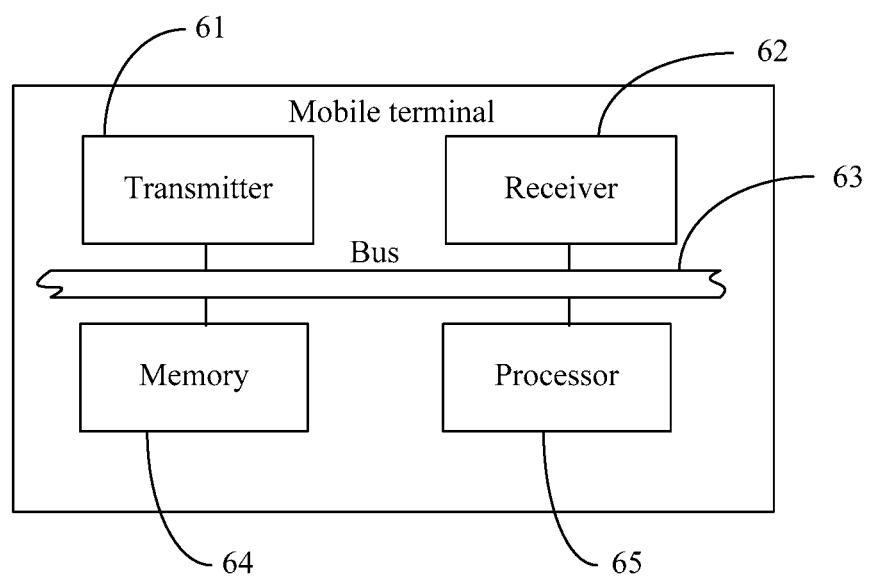
FIG. 6 is a schematic composition diagram of another embodiment of a mobile terminal according to the present invention.

FIG. 6 is a schematic composition diagram of another embodiment of a mobile terminal according to the present invention. As shown in FIG. 6, the mobile terminal includes a transmitter 61, a receiver 62, a bus 63, a memory 64, and a processor 65, where the memory 64 is configured to store an instruction, and the processor 65 reads the instruction and executes the following operation:

in a process of cell reselection, if learning through determining that a current serving cell is a high-quality cell, choosing to continue to camp on the serving cell, where the high-quality cell is a cell satisfying a determining rule for promoting a cell to a high-quality cell.

The mobile terminal implements a basic function of communication with outside by using the transmitter 61 and the receiver 62, for example, may receive, by using the receiver 62, a selection/reselection parameter delivered by a network side. The memory 64 may be configured to store a high-quality cell list, including description information of all cells that are identified as high-quality cells, for example, cell identities. Certainly, this embodiment of the present invention is not limited to the high-quality cell list, and another storage manner may be used.

The processor 65 may be further configured to perform cell measurement on the serving cell to obtain measurement parameters; and if learning through determining according to the measurement parameters that the serving cell satisfies the determining rule, identify the serving cell as a high-quality cell.

Specifically, the measurement parameters include a camping time in which the serving cell has been camped on until the cell measurement is performed, and signal quality and signal strength of the serving cell when the cell measurement is performed, where correspondingly, the determining rule is:

according to the camping time, the signal quality and the signal strength, and respective corresponding weights, acquiring a reference value corresponding to the serving cell and determining whether the reference value reaches a predetermined value.

The determining rule is in one-to-one correspondence with a cell standard, where
a determining rule corresponding to a WCDMA cell is that a reference value $Q_{ex}$ reaches a predetermined value $Q_{max}$, where $$Q_{ex} = \operatorname{Min}\left(\frac{t}{T_{std}} \times \partial_1, \partial_1\right) + \operatorname{Min}\left(\frac{Q_{qualmax} - |Q_{qualmeas}|}{Q_{qualmax} - |Q_{qualstd}|} \times \partial_2, \partial_2\right) + \operatorname{Min}\left(\left(\frac{Q_{rscpmax} - |Q_{rscpmeas}|}{Q_{rscpmax} - |Q_{rscpstd}|}\right) \times \partial_3, \partial_3\right),$$

where
$\partial_1, \partial_2$, and $\partial_3$ are the weights respectively occupied by the camping time, the signal quality, and the signal strength, and satisfy $\partial_1 + \partial_2 + \partial_3 = 1$, $\partial_1 \geq 0$, $\partial_2 \geq 0$, and $\partial_3 \geq 0$; $T_{std}$ is a reference time length for promoting a cell to a high-quality cell, t is the camping time; $Q_{qualstd}$ is a reference value of a signal to noise ratio Ec/No, $Q_{qualmeas}$ is an actual measured value of the Ec/No; $Q_{rscpstd}$ is a reference value of received signal code power RSCP, and $Q_{rscpmeas}$ is an actual measured value of the RSCP; and $Q_{qual\ max}$ and $Q_{rscp\ max}$ are both preset maximum values, and $Q_{max} \leq 1$.

In addition, a determining rule corresponding to a GSM cell is that a reference value $Q_{ex}$ reaches a predetermined value $Q_{max}$, where $$Q_{ex} = \operatorname{Min}\left(\frac{t}{T_{std}} \times \partial_4, \partial_4\right) + \operatorname{Min}\left(\frac{Q_{rxlevmax} - |Q_{rxlevmeas}|}{Q_{rxlevmax} - |Q_{rxlevstd}|} \times \partial_5, \partial_5\right) + \operatorname{Min}\left(\left(\frac{SNR_{max} - |SNR_{meas}|}{SNR_{max} - |SNR_{std}|}\right) \times \partial_6, \partial_6\right),$$

where
$\partial_4, \partial_5$, and $\partial_6$ are the weights respectively occupied by the camping time, the signal strength, and a signal to noise ratio, and satisfy $\partial_4 + \partial_5 + \partial_6 = 1$, $\partial_4 \geq 0$, $\partial_5 \geq 0$ and $\partial_6 \geq 0$; $T_{std}$ is a reference time length for promoting a cell to a high-quality cell, t is the camping time; $Q_{rxlevstd}$ is a reference value of received signal strength indicator RSSI, $Q_{rxlevmeas}$ is an actual measured value of the RSSI; $SNR_{std}$ is a reference value of the signal to noise ratio, and $SNR_{meas}$ is an actual measured value of the signal to noise ratio; and $Q_{rxlev\ max}$ and $SNR_{max}$ are both preset maximum values, and $Q_{max} \leq 1$.

The processor 65 is further configured to: in the process of the cell reselection, if learning through determining that the current serving cell is not a high-quality cell, continue to determine whether a neighboring cell is a high-quality cell, if the neighboring cell is a high-quality cell, determine whether the neighboring cell used as a high-quality cell satisfies a camping condition, and if the neighboring cell satisfies a camping condition, hand over to the neighboring cell used as a high-quality cell, where if the neighboring cell is a WCDMA cell, a corresponding camping condition includes:

$Q_{qualmeas} > Q_{qual\ min}$ && $Q_{rscpmeas} > Q_{rscp\ min}$ && last $t_{min}$ seconds, where $Q_{qualmeas}$ is an actual measured value of a signal to noise ratio Ec/No corresponding to the neighboring cell, $Q_{rscpmeas}$ is an actual measured value of received signal code power RSCP corresponding to the neighboring cell, $Q_{qual\ min}$ and $Q_{rscp\ min}$ are both minimum preset access values for being a high-quality cell, and $t_{min}$ represents minimum duration in which $Q_{qualmeas} > Q_{qual\ min}$ and $Q_{rscpmeas} > Q_{rscp\ min}$ are both satisfied.

The processor 65 is further configured to: in the process of the cell reselection, if learning through determining that the current serving cell is not a high-quality cell, continue to determine whether a neighboring cell is a high-quality cell, if the neighboring cell is a high-quality cell, determine whether the neighboring cell used as a high-quality cell satisfies a camping condition, and if the neighboring cell satisfies a camping condition, hand over to the neighboring cell used as a high-quality cell, where if the neighboring cell is a GSM cell, a corresponding camping condition includes:

$Q_{rxlevmeas} > Q_{rxlev\ min}$ && lasts $t_{min}$ seconds, where $Q_{rxlevmeas}$ is an actual measured value of received signal strength indicator RSSI corresponding to the neighboring cell, $Q_{rxlev\ min}$ is a preset minimum access value for being a high-quality cell, and $t_{min}$ represents minimum duration in which $Q_{rxlevmeas} > Q_{rxlev\ min}$ is satisfied.

The memory 64 further stores a database, where the database is divided into multiple partitions according to cell standards, and a cell identity of the target cell is stored in a partition of a corresponding standard.

According to the mobile terminal provided in this embodiment of the present invention, a cell satisfying a determining rule for promoting a cell to a high-quality cell is managed as a high-quality cell, and in a process of cell reselection, if a current serving cell is a high-quality cell occurs, a processing manner of continuing to camp on the current serving cell is selected, reducing frequent handovers between cells, improving service quality of service, and reducing power consumption of the mobile terminal.

In the several embodiments provided in the present invention, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

It may be clearly understood by persons skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A cell reselection method, comprising:
   in a process of cell reselection, performing cell measurement on a current serving cell to obtain measurement parameters, wherein the measurement parameters comprise a camping time in which the current serving cell has been camped on until the cell measurement is performed, and signal quality and signal strength of the current serving cell when the cell measurement is performed, wherein correspondingly, the determining rule is:
   according to the camping time, the signal quality and the signal strength, and respective corresponding weights, acquiring a reference value corresponding to the current serving cell and determining whether the reference value reaches a predetermined value;
   comparing the measurement parameters to a determining rule;
   upon the current serving cell satisfying the determining rule, identifying the serving cell as a high-quality cell; and
   upon identifying the current serving cell as a high-quality cell, continuing to camp on the current serving cell regardless of availability of high-quality neighboring cells.

2. The method according to claim 1, wherein the determining rule is in a one-to-one correspondence with a cell standard, wherein a determining rule corresponding to a WCDMA cell is that a reference value $Q_{ex}$ reaches a predetermined value $Q_{max}$, wherein $$Q_{ex} = \text{Min}\left(\frac{t}{T_{std}} \times \partial_1, \partial_1\right) + \text{Min}\left(\frac{Q_{qualmax} - |Q_{qualmeas}|}{Q_{qualmax} - |Q_{qualstd}|} \times \partial_2, \partial_2\right) + \text{Min}\left(\left(\frac{Q_{rscpmax} - |Q_{rscpmeas}|}{Q_{rscpmax} - |Q_{rscpstd}|}\right) \times \partial_3, \partial_3\right),$$

wherein $\partial_1$, $\partial_2$, and $\partial_3$ are the weights respectively occupied by the camping time, the signal quality, and the signal strength, and satisfy $\partial_1 + \partial_2 + \partial_3 = 1$, $\partial_1 \geq 0$, $\partial_2 \geq 0$, and $\partial_3 \geq 0$; $T_{std}$ is a reference time length for promoting a cell to a high-quality cell, t is the camping time; $Q_{qualstd}$ is a reference value of a signal to noise ratio Ec/No, $Q_{qualmeas}$ is an actual measured value of the Ec/No; $Q_{rscpstd}$ is a reference value of received signal code power (RSCP), and $Q_{rscpmeas}$ is an actual measured value of the RSCP; and $Q_{qual\ max}$ and $Q_{rscp\ max}$ are both preset maximum values, and $Q_{max} \leq 1$.

3. The method according to claim 1, wherein the determining rule is in a one-to-one correspondence with a cell standard, wherein a determining rule corresponding to a GSM cell is that a reference value $Q_{ex}$ reaches a predetermined value $Q_{max}$, wherein $$Q_{ex} = \text{Min}\left(\frac{t}{T_{std}} \times \partial_4, \partial_4\right) + \text{Min}\left(\frac{Q_{rxlevmax} - |Q_{rxlevmeas}|}{Q_{rxlevmax} - |Q_{rxlevstd}|} \times \partial_5, \partial_5\right) + \text{Min}\left(\left(\frac{SNR_{max} - |SNR_{meas}|}{SNR_{max} - |SNR_{std}|}\right) \times \partial_6, \partial_6\right),$$

wherein $\partial_4$, $\partial_5$, and $\partial_6$ are the weights respectively occupied by the camping time, the signal strength, and a signal to noise ratio, and satisfy $\partial_4 + \partial_5 + \partial_6 = 1$, $\partial_4 \geq 0$, $\partial_5 \geq 0$, and $\partial_6 \geq 0$; $T_{std}$ is a reference time length for promoting a cell to a high-quality cell, t is the camping time; $Q_{rxlevstd}$ is a reference value of received signal strength indicator (RSSI), $Q_{rxlevmeas}$ is an actual measured value of the RSSI; $SNR_{std}$ is a reference value of the signal to noise ratio, and $SNR_{meas}$ is an actual measured value of the signal to noise ratio; and $Q_{rxlev\ max}$ and $SNR_{max}$ are both preset maximum values, and $Q_{max} \leq 1$.

4. The method according to claim 1, further comprising:
in the process of the cell reselection, upon determining that the current serving cell is not a high-quality cell, continuing to determine whether a neighboring cell is a high-quality cell, if the neighboring cell is a high-quality cell, determining whether the neighboring cell used as a high-quality cell satisfies a camping condition, and if the neighboring cell is a high-quality cell, handing over to the neighboring cell used as a high-quality cell, wherein if the neighboring cell is a WCDMA cell, a corresponding camping condition comprises:

$Q_{qualmeas} > Q_{qual\ min}$ && $Q_{rscpmeas} > Q_{rscp\ min}$ && last $t_{min}$ seconds, wherein $Q_{qualmeas}$ is an actual measured value of a signal to noise ratio Ec/No corresponding to the neighboring cell, $Q_{rscpmeas}$ is an actual measured value of received signal code power (RSCP) corresponding to the neighboring cell, $Q_{qual\ min}$ and $Q_{rscp\ min}$ are both minimum preset access values for being a high-quality cell, and $t_{min}$ represents minimum duration in which $Q_{qualmeas} > Q_{qual\ min}$ and $Q_{rscpmeas} > Q_{rscp\ min}$ are both satisfied.

5. The method according to claim 1, further comprising:
in the process of the cell reselection, upon determining that the current serving cell is not a high-quality cell, continuing to determine whether a neighboring cell is a high-quality cell, if the neighboring cell is a high-quality cell, determining whether the neighboring cell used as a high-quality cell satisfies a camping condition, and if the neighboring cell is a high-quality cell, handing over to the neighboring cell used as a high-quality cell, wherein if the neighboring cell is a GSM cell, a corresponding camping condition comprises:

$Q_{rxlevmeas} > Q_{rxlev\ min}$ && lasts $t_{min}$ seconds, wherein $Q_{rxlevmeas}$ is an actual measured value of received signal strength indicator (RSSI) corresponding to the neighboring cell, $Q_{rxlev\ min}$ is a preset minimum access value for being a high-quality cell, and $t_{min}$ represents minimum duration in which $Q_{rxlevmeas} > Q_{rxlev\ min}$ is satisfied.

6. The method according to claim 1, wherein identifying a target cell as a high-quality cell comprises:

dividing a database into multiple partitions according to cell standards, and storing a cell identity of the target cell in a partition of a corresponding standard.

7. A mobile terminal, comprising:
a processor; and
a memory storing computer program instructions which, when executed by the processor, perform operations comprising:

in a process of cell reselection, performing cell measurement on a current serving cell to obtain measurement parameters, wherein the measurement parameters comprise a camping time in which the serving cell has been camped on until the cell measurement is performed, and signal quality and signal strength of the serving cell when the cell measurement is performed, wherein correspondingly, the determining rule is:

according to the camping time, the signal quality and the signal strength, and respective corresponding weights, acquiring a reference value corresponding to the serving cell and determining whether the reference value reaches a predetermined value;

comparing the measurement parameters to a determining rule;

upon the current serving cell satisfying the determining rule, identifying the current serving cell as a high-quality cell; and upon identifying the current serving cell as a high-quality cell, continuing to camp on the current serving cell regardless of availability of high-quality neighboring cells.

8. The mobile terminal according to claim 7, wherein the determining rule is in a one-to-one correspondence with a cell standard, wherein a determining rule corresponding to a WCDMA cell is that a reference value $Q_{ex}$ reaches a predetermined value $Q_{max}$, wherein $$Q_{ex} = \text{Min}\left(\frac{t}{T_{std}} \times \partial_1, \partial_1\right) + \text{Min}\left(\frac{Q_{qualmax} - |Q_{qualmeas}|}{Q_{qualmax} - |Q_{qualstd}|} \times \partial_2, \partial_2\right) +$$

-continued $$\text{Min}\left(\left(\frac{Q_{rscpmax} - |Q_{rscpmeas}|}{Q_{rscpmax} - |Q_{rscpstd}|}\right) \times \partial_3, \partial_3\right),$$

wherein $\partial_1$, $\partial_2$, and $\partial_3$ are the weights respectively occupied by the camping time, the signal quality, and the signal strength, and satisfy $\partial_1 + \partial_2 + \partial_3 = 1$, $\partial_1 \geq 0$, $\partial_2 \geq 0$, and $\partial_3 \geq 0$; $T_{std}$ is a reference time length for promoting a cell to a high-quality cell, t is the camping time; $Q_{qualstd}$ is a reference value of a signal to noise ratio Ec/No, $Q_{qualmeas}$ is an actual measured value of the Ec/No; $Q_{rscpstd}$ is a reference value of received signal code power (RSCP), and $Q_{rscpmeas}$ is an actual measured value of the RSCP; and $Q_{qual\ max}$ and $Q_{rscp\ max}$ are both preset maximum values, and $Q_{max} \leq 1$.

9. The mobile terminal according to claim 7, wherein the determining rule is in a one-to-one correspondence with a cell standard, wherein a determining rule corresponding to a GSM cell is that a reference value $Q_{ex}$ reaches a predetermined value $Q_{max}$, wherein $$Q_{ex} = \text{Min}\left(\frac{t}{T_{std}} \times \partial_4, \partial_4\right) + \text{Min}\left(\frac{Q_{rxlevmax} - |Q_{rxlevmeas}|}{Q_{rxlevmax} - |Q_{rxlevstd}|} \times \partial_5, \partial_5\right) + \text{Min}\left(\left(\frac{SNR_{max} - |SNR_{meas}|}{SNR_{max} - |SNR_{std}|}\right) \times \partial_6, \partial_6\right),$$

wherein $\partial_4$, $\partial_5$, and $\partial_6$ are the weights respectively occupied by the camping time, the signal strength, and a signal to noise ratio, and satisfy $\partial_4 + \partial_5 + \partial_6 = 1$, $\partial_4 \geq 0$, $\partial_5 \geq 0$, and $\partial_6 \geq 0$; $T_{std}$ is a reference time length for promoting a cell to a high-quality cell, t is the camping time; $Q_{rxlevstd}$ is a reference value of received signal strength indicator (RSSI), $Q_{rxlevmeas}$ is an actual measured value of the RSSI; $SNR_{std}$ is a reference value of the signal to noise ratio, and $SNR_{meas}$ is an actual measured value of the signal to noise ratio; and $Q_{rxlev\ max}$ and $SNR_{max}$ are both preset maximum values, and $Q_{max} \leq 1$.

10. The mobile terminal according to claim 7, wherein the operations further comprise:

in the process of the cell reselection, upon determining that the current serving cell is not a high-quality cell, continuing to determine whether a neighboring cell is a high-quality cell, if the neighboring cell is a high-quality cell, determining whether the neighboring cell used as a high-quality cell satisfies a camping condition, and if the neighboring cell is a high-quality cell, handing over to the neighboring cell used as a high-quality cell, wherein if the neighboring cell is a WCDMA cell, a corresponding camping condition comprises:

$Q_{qualmeas} > Q_{qual\ min}$ && $Q_{rscpmeas} > Q_{rscp\ min}$ && last $t_{min}$ seconds, wherein $Q_{qualmeas}$ is an actual measured value of a signal to noise ratio Ec/No corresponding to the neighboring cell, $Q_{rscpmeas}$ is an actual measured value of received signal code power (RSCP) corresponding to the neighboring cell, $Q_{qual\ min}$ and $Q_{rscp\ min}$ are both minimum preset access values for being a high-quality cell, and $t_{min}$ represents minimum duration in which $Q_{qualmeas} > Q_{qual\ min}$ and $Q_{rscpmeas} > Q_{rscp\ min}$ are both satisfied.

11. The mobile terminal according to claim 7, wherein the operations further comprise:

in the process of the cell reselection, upon determining that the current serving cell is not a high-quality cell, continuing to determine whether a neighboring cell is a high-quality cell, if the neighboring cell is a high-quality cell, determining whether the neighboring cell used as a high-quality cell satisfies a camping condition, and if the neighboring cell is a high-quality cell, handing over to the neighboring cell used as a high-quality cell, wherein if the neighboring cell is a GSM cell, a corresponding camping condition comprises:

$Q_{rxlevmeas} > Q_{rxlev\ min}$ && lasts $t_{min}$ seconds, wherein $Q_{rxlevmeas}$ is an actual measured value of received signal strength indicator (RSSI) corresponding to the neighboring cell, $Q_{rxlev\ min}$ is a preset minimum access value for being a high-quality cell, and $t_{min}$ represents minimum duration in which $Q_{rxlevmeas} > Q_{rxlev\ min}$ is satisfied.

12. The mobile terminal according to claim 7, wherein the operations further comprise:

dividing a database into multiple partitions according to cell standards, and storing a cell identity of a target cell in a partition of a corresponding standard.

* * * * *